United States Patent
Baldemair et al.

(10) Patent No.: US 8,867,463 B2
(45) Date of Patent: Oct. 21, 2014

(54) WEIGHTED SOFT BUFFER HANDLING IN RADIOCOMMUNICATION SYSTEMS

(75) Inventors: Robert Baldemair, Solna (SE);
Jung-Fu Cheng, Fremont, CA (US);
Dirk Gerstenberger, Stockhom (SE);
Daniel Larsson, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 278 days.

(21) Appl. No.: 13/334,451

(22) Filed: Dec. 22, 2011

(65) Prior Publication Data

US 2012/0188952 A1    Jul. 26, 2012

Related U.S. Application Data

(60) Provisional application No. 61/427,524, filed on Dec. 28, 2010, provisional application No. 61/431,155, filed on Jan. 10, 2011.

(51) Int. Cl.
| | |
|---|---|
| H04W 4/00 | (2009.01) |
| H04B 7/00 | (2006.01) |
| G01R 31/08 | (2006.01) |
| H04J 3/16 | (2006.01) |
| H04L 1/18 | (2006.01) |
| H04W 72/04 | (2009.01) |
| H04L 5/00 | (2006.01) |
| H04W 88/02 | (2009.01) |
| H04L 1/00 | (2006.01) |

(52) U.S. Cl.
CPC ......... *H04L 5/0001* (2013.01); *H04W 72/0453* (2013.01); *H04L 1/1845* (2013.01); *H04L 5/0091* (2013.01); *H04L 5/001* (2013.01); *H04L 1/1822* (2013.01); *H04W 88/02* (2013.01); *H04L 1/0007* (2013.01); *H04W 72/042* (2013.01)
USPC ............ 370/329; 370/277; 370/230; 370/437

(58) Field of Classification Search
CPC ........ H04W 72/04; H04W 88/08; H04L 5/14; H04L 47/10; H04L 2012/5631; H04L 47/15; H04L 5/0046
USPC .......................................................... 370/329
See application file for complete search history.

(56) References Cited

U.S. PATENT DOCUMENTS

| | | | |
|---|---|---|---|
| 8,437,308 B2 * | 5/2013 | Lindoff | 370/331 |
| 2005/0180502 A1 * | 8/2005 | Puri | 375/240.03 |

(Continued)

FOREIGN PATENT DOCUMENTS

| | | |
|---|---|---|
| WO | 2010/110607 A2 | 9/2010 |
| WO | 2012/063227 A2 | 5/2012 |

OTHER PUBLICATIONS

Catt; "Soft buffer size allocation for Rel-10 UE"; 3 GPP TSGA RAN WG1 Meeting #63; R1-105937; 3rd Generation Partnership Project (3GPP); Nov. 15-19, 2010; pp. 1-3; Jacksonville, Florida.

(Continued)

*Primary Examiner* — Faruk Hamza
*Assistant Examiner* — Abu-Sayeed Haque
(74) *Attorney, Agent, or Firm* — Patent Portfolio Builders PLLC

(57) ABSTRACT

Weighting factor information can be transmitted from a base station toward a terminal. The weighting factor information can be used by the terminal to allocate a portion of a buffer for received codewords, or transport blocks, associated with each component carrier that has been assigned to that terminal.

37 Claims, 11 Drawing Sheets

(56) References Cited

U.S. PATENT DOCUMENTS

2011/0293049 A1* 12/2011 Niewczas et al. ............. 375/344
2013/0176981 A1* 7/2013 Earnshaw et al. ............. 370/329

OTHER PUBLICATIONS

International Search Report in corresponding International Application No. PCT/SE2011/051579 mailed Apr. 19, 2012.

Written Opinion of the International Searching Authority in corresponding International Application No. PCT/SE2011/051579 mailed Apr. 19, 2012.

Ericsson, ST-Ericsson; "Views on soft buffer handling for Rel-10 UEs"; 3GPP TSG RAN WG1 Meeting #63, R1-11033; Agenda Item 6.2.1; pp. 1-4; Jan. 17-21, 2010; Dublin, Ireland; XP-050490014.

Huawei, et al; "Soft buffer size allocation for Rel-10 downlink"; GPP TSG RAN WG1 Meeting #63bis, R1-106513; Agenda Item 6.9; pp. 1-3; Nov. 15-19, 2010; Jacksonville, USA; XP050489917.

3GPP TS 36.213 V10.0.0., Technical Specification; "3rd Generation Partnership Project; Technical Specification Group Radio Access Network; Evolved Universal Terrestrial Radio Access ( E-UTRA); Physical layer procedures (Release 10)"; LTE; pp. 1-98; Dec. 2010; Valbonne, France.

ETSI TS 136 212 V10.0.0, Technical Specification; "LTE; Evolved Universal Terrestrial Radio Access (E-UTRA); Multiplexing and channel coding (3GPP TS 36.212 version 10.0.0 Release 10)"; pp. 1-74; Jan. 2011; Cedex, France.

ETSI TS 136 331 V10.0.0, Technical Specification; "LTE; Evolved Universal Terrestrial Radio Access (E-UTRA); Radio Resource Control (RRC); Protocol specification (3GPP TS 36.331 version 10.0.0 Release 10)"; Jan. 2011; pp. 1-280; Cedex, France.

\* cited by examiner

| SB0 | SB1 | SB2 | SB3 | SB4 | SB5 | SB6 | SB7 |

FIG. 6

| SB0a | SB1a | SB2a | SB3a | SB4a | SB5a | SB6a | SB7a |
| SB0b | SB1b | SB2b | SB3b | SB4b | SB5b | SB6b | SB7b |

FIG. 7

TRANSMITTING, BY THE BASE STATION, INFORMATION FOR IDENTIFYING, FOR EACH COMPONENT CARRIER ALLOCATED TO THE TERMINAL, A WEIGHTING FACTOR ASSOCIATED WITH A RESPECTIVE COMPONENT CARRIER ALLOCATED TO THE TERMINAL ─1600

FIG. 16

WEIGHTED SOFT BUFFER HANDLING IN RADIOCOMMUNICATION SYSTEMS

RELATED APPLICATIONS

The present application is related to, and claims priority from, U.S. Provisional Patent Application No. 61/427,524, filed on Dec. 28, 2010, and U.S. Provisional Patent Application No. 61/431,155 filed on Jan. 10, 2011, the disclosures of which are incorporated here by reference.

TECHNICAL FIELD

The present invention relates generally to telecommunications systems, and in particular, to methods, systems, devices and software for soft buffer handling in radiocommunications systems.

BACKGROUND

Radiocommunication networks were originally developed primarily to provide voice services over circuit-switched networks. The introduction of packet-switched bearers in, for example, the so-called 2.5G and 3G networks enabled network operators to provide data services as well as voice services. Eventually, network architectures will likely evolve toward all Internet Protocol (IP) networks which provide both voice and data services. However, network operators have a substantial investment in existing infrastructures and would, therefore, typically prefer to migrate gradually to all IP network architectures in order to allow them to extract sufficient value from their investment in existing infrastructures. Also to provide the capabilities needed to support next generation radiocommunication applications, while at the same time using legacy infrastructure, network operators could deploy hybrid networks wherein a next generation radiocommunication system is overlaid onto an existing circuit-switched or packet-switched network as a first step in the transition to an all IP-based network. Alternatively, a radiocommunication system can evolve from one generation to the next while still providing backward compatibility for legacy equipment.

One example of such an evolved network is based upon the Universal Mobile Telephone System (UMTS) which is an existing third generation (3G) radiocommunication system that is evolving into High Speed Packet Access (HSPA) technology. Yet another alternative is the introduction of a new air interface technology within the UMTS framework, e.g., the so-called Long Term Evolution (LTE) technology. Target performance goals for LTE systems include, for example, support for 200 active calls per 5 MHz cell and sub 5 ms latency for small IP packets. Each new generation, or partial generation, of mobile communication systems add complexity and abilities to mobile communication systems and this can be expected to continue with either enhancements to proposed systems or completely new systems in the future.

LTE uses orthogonal frequency division multiplexing (OFDM) in the downlink and discrete Fourier transform (DFT)-spread OFDM in the uplink. The basic LTE downlink physical resource can thus be seen as a time-frequency grid as illustrated in FIG. 1, where each resource element corresponds to one OFDM subcarrier during one OFDM symbol interval. In the time domain, LTE downlink transmissions are organized into radio frames of 10 ms, each radio frame consisting of ten equally-sized subframes of length $T_{subframe}=1$ ms as shown in FIG. 2.

Furthermore, the resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth. Downlink transmissions are dynamically scheduled, i.e., in each subframe the base station—typically referred to as an eNB in LTE—transmits control information indicating to which terminals and on which resource blocks the data is transmitted during the current downlink subframe. This control signaling is typically transmitted in the first 1, 2, 3 or 4 OFDM symbols in each subframe. A downlink system with 3 OFDM symbols as the control region is illustrated in FIG. 3.

Data is transmitted to the terminal in the form of either one or two transport blocks per subframe. Each transport block is segmented into code block according to section 5.1.2 in 3GPP Technical Specification 36.212 V10.0.0. Each code block is coded and rate matched according to 3GPP Technical Specification 36.212 V10.0.0. The rate matched and coded bits are then concatenated per associated transport block according to 3GPP Technical Specification 36.212 V 10.0.0, which is referred to as code block concatenation. This sequence of coded and rate matched bits that corresponds to one transport block after code block concatenation is referred to as one codeword. LTE uses hybrid-ARQ (HARM) where, after receiving downlink data in a subframe, the terminal attempts to decode it and reports to the base station whether the decoding was successful (ACK) or not (NACK). In the case of an unsuccessful decoding attempt, the base station can retransmit the erroneous data to the terminal or user equipment (UE). In LTE systems, HARQ with incremental redundancy is used. Thus, instead of re-transmitting the same portion of the codeword, different redundancy versions are re-transmitted yielding an extra gain over, for example, Chase combinin.

Ideally, a buffer of sufficient size should be available at the receiver side for HARQ transmissions and retransmissions so that the received soft values for entire codewords can be stored. However, due to terminal complexity and cost concerns, the soft buffer size in a terminal is typically limited. For example, for higher rate transmissions, i.e., where larger codewords are sent from the transmitter, the size of a UE's buffer may not be sufficient to store the complete codeword. Therefore, the eNB and UE should both have knowledge about the soft buffer size since otherwise the eNB may transmit coded bits the UE cannot store.

FIG. 4 depicts simplified a complete codeword 400, including both systematic bits and parity bits, and also shows how many soft bits the terminal can store for a given soft buffer size relative to the codeword size, according to one illustrative example. If the eNB and terminal have the same understanding about the soft buffer size, then the eNB will not transmit coded bits the terminal cannot store. Instead, the eNB only takes those coded bits that are stored by the terminal and uses those bits for transmissions or re-transmissions.

This aspect of HARQ-related buffering of codewords can be depicted by a circular buffer 500, an example of which is shown in FIG. 5. Like FIG. 4, each buffered transmission or re-transmission will typically include both systematic bits 502 and parity bits 504. Note that in this example, the complete circle 500 corresponds to the soft buffer size and not to the entire codeword. In a first transmission, depending on the code rate, some/all of the systematic bits 502 and none/some parity bits 504 are transmitted. In a retransmission, the starting position is changed and bits corresponding to another part of the circumference of the circular buffer 500 are transmitted.

In Rel-8 LTE FDD, each terminal has up to 8 HARQ processes per component carrier and each HARQ process can contain up to two sub-processes for supporting dual-codeword MIMO transmissions. The design set forth in Rel-8 LTE is to divide the available soft buffer equally into the configured number of HARQ processes. Each portion of the divided soft buffer can then be used to store soft values of the received codewords. In the case of dual-codeword MIMO transmission, the divided soft buffer shall be further divided equally to store the soft values of the two received codewords. These aspects of soft buffer allocation are described in more detail in the standard document 3GPP Technical Specification 36.212, Section 5.1.4.1.2 "Bit collection, selection and transmission", the disclosure of which is incorporated here by reference.

The soft buffer allocation described in the above-incorporated by reference standard document for the single-codeword transmission modes in Rel-8 of LTE is conceptually illustrated in FIG. 6. Note that in FIG. 6, there is a buffer SB0-SB7 reserved for each codeword. The soft buffer allocation for the dual-codeword transmission modes described above for Rel-8 of LTE is illustrated in FIG. 7. Note that in FIG. 7, the buffer reserved for each codeword is only half the size of the previous operating case of FIG. 6. This illustrates that the soft buffer limitation problem is particular acute in dual-codeword MIMO transmission operations. This limitation reduces the effectiveness of soft combining gains from incremental redundancy retransmissions.

The LTE Rel-8 standard has recently been standardized, supporting bandwidths up to 20 MHz. In order to meet the upcoming IMT-Advanced requirements, 3GPP is currently standardizing LTE Rel-10, also referred to as "LTE-Advanced". One property of Rel-10 is the support of bandwidths larger than 20 MHz while still providing backwards compatibility with Rel-8. This is achieved by aggregating multiple component carriers, each of which can be Rel-8 compatible, to form a larger overall bandwidth to a Rel-10 terminal. For example, as shown in FIG. 8, five component carriers (CCs) 800 can be aggregated into a single 100 MHz bandwidth. Note that carrier aggregation can involve contiguous intra-band carrier aggregation, non-contiguous intra-band carrier aggregation, and/or inter-band carrier aggregation.

In LTE-10 each component carrier will operate with its own set of HARQ processes. Since the total soft buffer memory needs to be shared among the component carriers, the soft buffer size per component carrier can vary depending on the number of configured component carriers and the number of configured MIMO transmission modes for each component carrier. The available soft buffer size for each codeword also depends on how the soft buffer is divided and allocated amongst all codewords.

Thus, the issues described above with respect to soft buffer sizes and allocations are expected to be exacerbated in Rel-10 of LTE with the addition of carrier aggregation.

| ABBREVIATIONS/ACRONYMS | |
|---|---|
| Rel-8 | Release-8 |
| Rel-10 | Release-10 |
| ACK | Acknowledgement |
| ARQ | Automatic Repeat Request |
| CA | Carrier Aggregation |
| CC | Component Carrier |
| FDD | Frequency Division Duplexing |
| HARQ | Hybrid Automatic Repeat Request |
| IMT | International Mobile Telecommunications |
| LTE | Long term evolution |
| MIMO | Multiple-Input Muliple-Output |
| NAK | Non Acknowledgement |
| NACK | Non Acknowledgement |

| ABBREVIATIONS/ACRONYMS | |
|---|---|
| OFDM | Orthogonal Frequency Division Multiple Access |
| UE | User equipment |

SUMMARY

According to an embodiment, a method in a terminal device for allocating portions of a buffer, the terminal device receiving transport blocks transmitted by a base station on one or more component carriers allocated to the terminal device, includes the steps of receiving, by the terminal device, a signal including information for identifying, for each component carrier allocated to the terminal, a weighting factor associated with a respective component carrier; and allocating, by the terminal device for each component carrier allocated to the terminal, a portion of the buffer in which to store transport blocks received on the respective component carrier based on the received information for identifying the weighting factor associated with the respective component carrier.

According to an embodiment, a terminal device includes a transceiver configured to receive transport blocks transmitted by a base station on one or more component carriers allocated to the terminal device, the transceiver further configured to receive a signal including information for identifying, for each component carrier allocated to the terminal device, a weighting factor associated with a respective component carrier, a buffer memory device configured to store received transport blocks from each component carrier, and a processor configured to allocate, for each component carrier allocated to the terminal device, a portion of the buffer memory device in which to store the received transport blocks based on the received information for identifying the weighting factor associated with the respective component carrier.

According to an embodiment, a method in a base station for enabling a terminal to handle a buffer for storing transport blocks transmitted by the base station to the terminal on one or more component carriers allocated to the terminal device, the method includes the step of transmitting, by the base station, information for identifying, for each component carrier allocated to the terminal, a weighting factor associated with a respective component carrier allocated to the terminal.

According to an embodiment, a base station includes a transceiver configured to transmit transport blocks to a terminal on one or more component carriers allocated to the terminal, the transceiver further configured to transmit information for identifying, for each component carrier allocated to the terminal, a weighting factor associated with a respective component carrier allocated to the terminal.

Among other advantages, it will be appreciated that according to embodiments, the available buffer memory per component carrier can reflect the coverage area and/or the available processing power in the eNB per component carrier. This enables, for example, a more accurate soft buffer division to be able to get higher incremental redundancy gains, which will give higher throughput. However those skilled in the art will appreciate that these advantages, while indicative of benefits associated with the embodiments, are not themselves required features of all embodiments.

BRIEF DESCRIPTION OF THE DRAWINGS

The example embodiments described below will be understood, in conjunction with the drawings submitted herewith in which:

FIG. 6 shows soft buffer allocation in Rel-8 LTE when the PDSCH transmission mode is other than mode 3, 4 or 8;

FIG. 7 shows soft buffer allocation in Rel-8 LTE when the PDSCH transmission mode is mode 3, 4 or 8;

FIGS. 15 and 16 are flowcharts depicting methods according to embodiments.

DETAILED DESCRIPTION

The following detailed description of the example embodiments refers to the accompanying drawings. The same reference numbers in different drawings identify the same or similar elements. Also, the following detailed description does not limit the invention. Instead, the scope of the invention is defined by the appended claims. The following embodiments are discussed, for simplicity, with regard to the terminology and structure of LTE systems. However, the embodiments to be discussed next are not limited to LTE systems but may be applied to other telecommunications systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Figure 1:
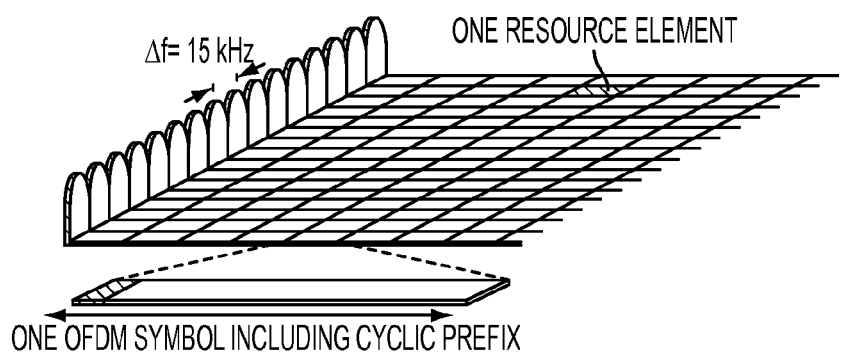
FIG. 1 represents an LTE OFDM downlink signal in the frequency/time domain.
Figure 2:
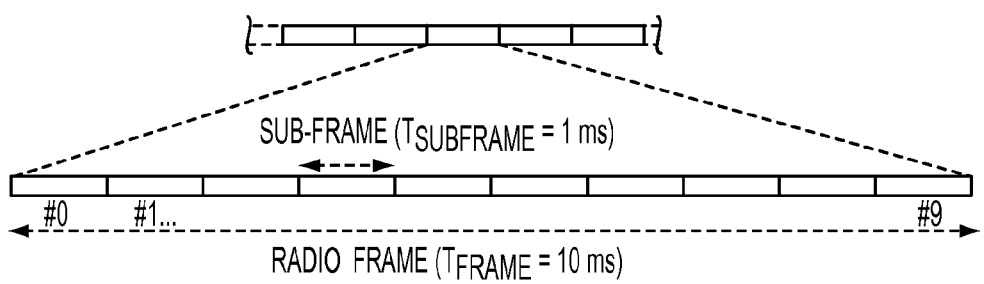
FIG. 2 shows a subframe associated with an LTE OFDM signal in the time domain.
Figure 3:
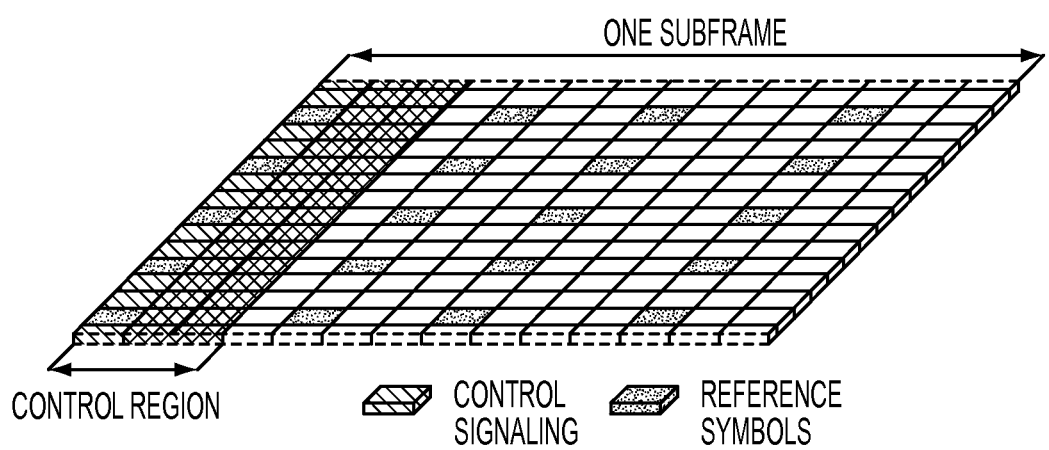
FIG. 3 illustrates a downlink signal with 3 OFDM symbols as the control region.
Figure 4:
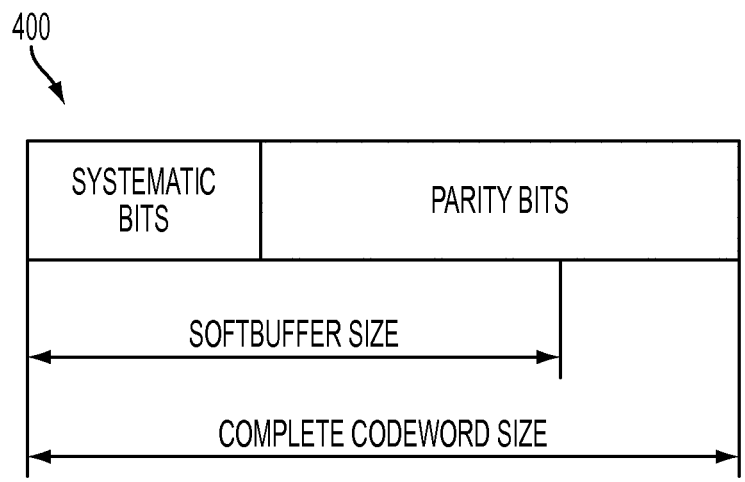
FIG. 4 depicts an example relationship between a soft buffer size and a codeword size.
Figure 5:
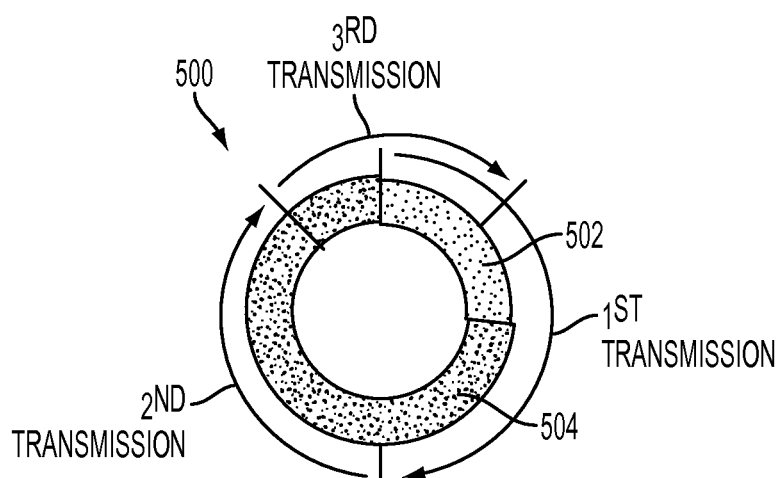
FIG. 5 illustrates a circular buffer associated with codeword storage.
Figure 8:
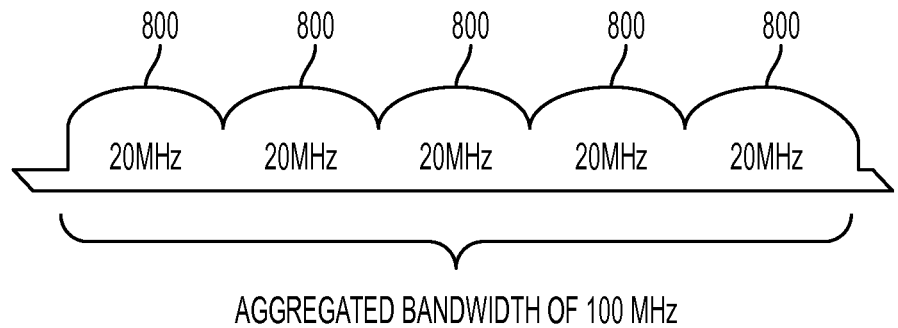
FIG. 8 shows an example of carrier aggregation.
Figure 9:
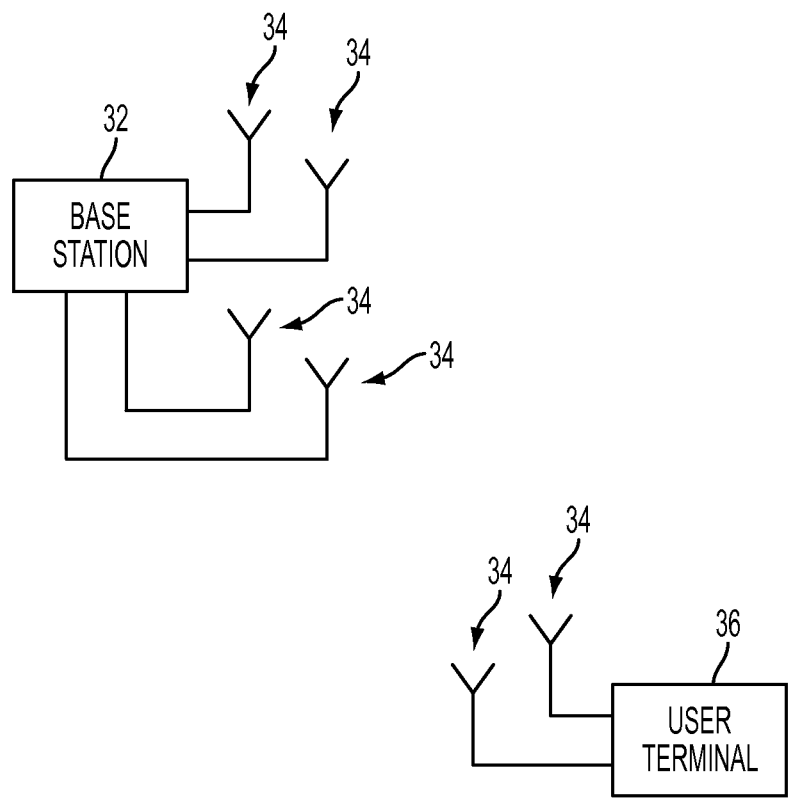
FIG. 9 illustrates an example base station and mobile station in which example embodiments can be implemented.
Figure 10:
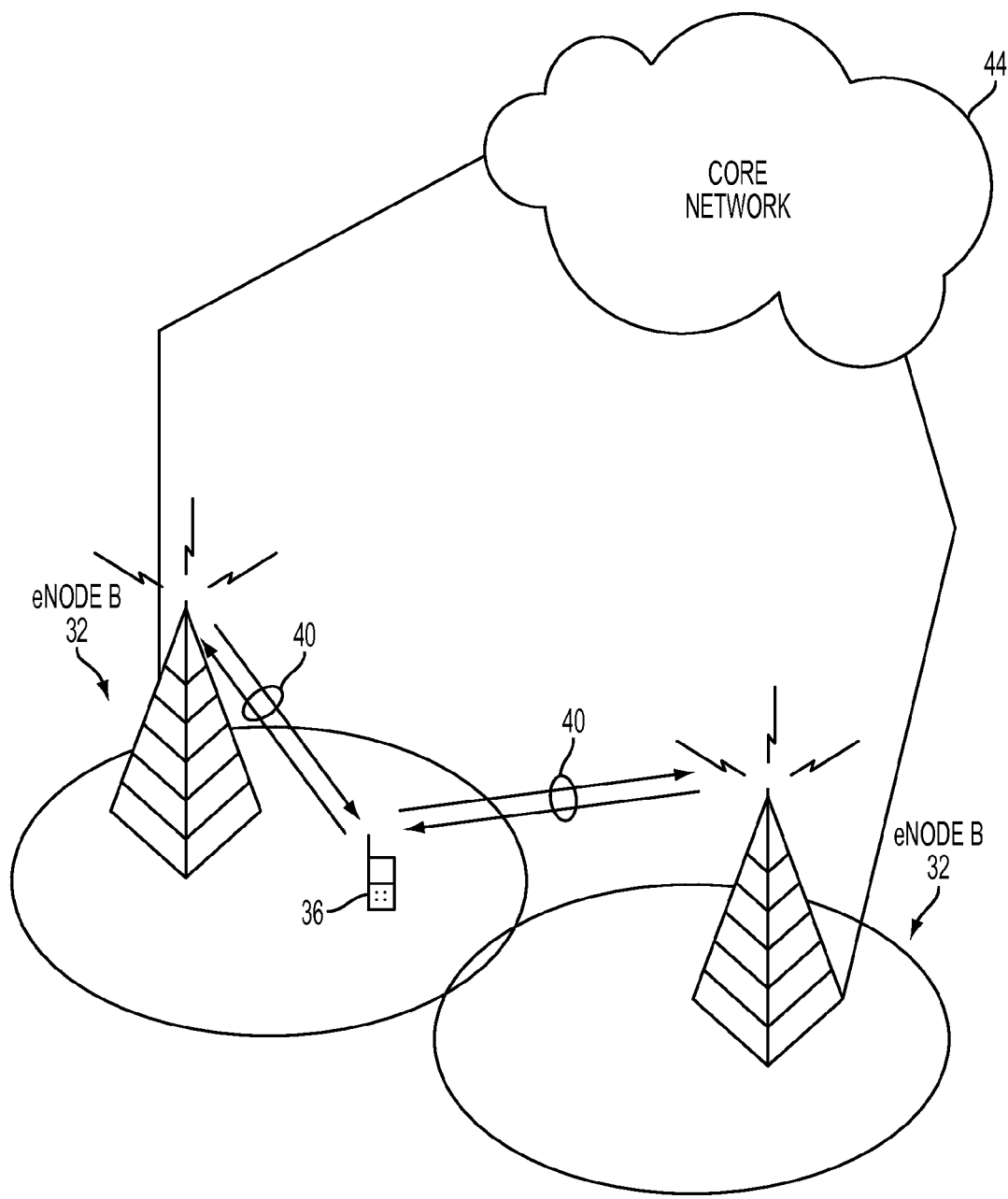
FIG. 10 depicts a radiocommunication system in which example embodiments can be implemented.

To provide some context for the following example embodiments related to uplink control signaling and reducing interference associated therewith, consider the example radiocommunication system as shown from two different perspectives in FIGS. 9 and 10, respectively. To increase the transmission rate of the systems, and to provide additional diversity against fading on the radio channels, modern wireless communication systems include transceivers that use multi-antennas—often referred to as a MIMO systems—. The multi-antennas may be distributed to the receiver side, to the transmitter side and/or provided at both sides as shown in FIG. 9. More specifically, FIG. 9 shows a base station 32 having four antennas 34 and a user terminal—also referred to herein as "user equipment" or "UE"—36 having two antennas 34. The number of antennas shown in FIG. 9 is example and is not intended to limit the actual number of antennas used at the base station 32 or at the user terminal 36 in the example embodiments to be discussed below.

Additionally, the term "base station" is used herein as a generic term. As will be appreciated by those skilled in the art, in the LTE architecture an evolved NodeB (eNodeB) may correspond to the base station, i.e., a base station is a possible implementation of the eNodeB. However, the term "eNodeB" is also broader in some senses than the conventional base station since the eNodeB refers, in general, to a logical node. The term "base station" is used herein as inclusive of a base station, a NodeB, an eNodeB or other nodes specific for other architectures. An eNodeB in an LTE system handles transmission and reception in one or several cells, as shown for example in FIG. 10.

FIG. 10 shows, among other things, two eNodeBs 32 and one user terminal 36. The user terminal 36 uses dedicated channels 40 to communicate with the eNodeB(s) 32, e.g., by transmitting or receiving RLC PDU segments as according to example embodiments described below. The two eNodeBs 32 are connected to a Core Network 44.

Figure 11:
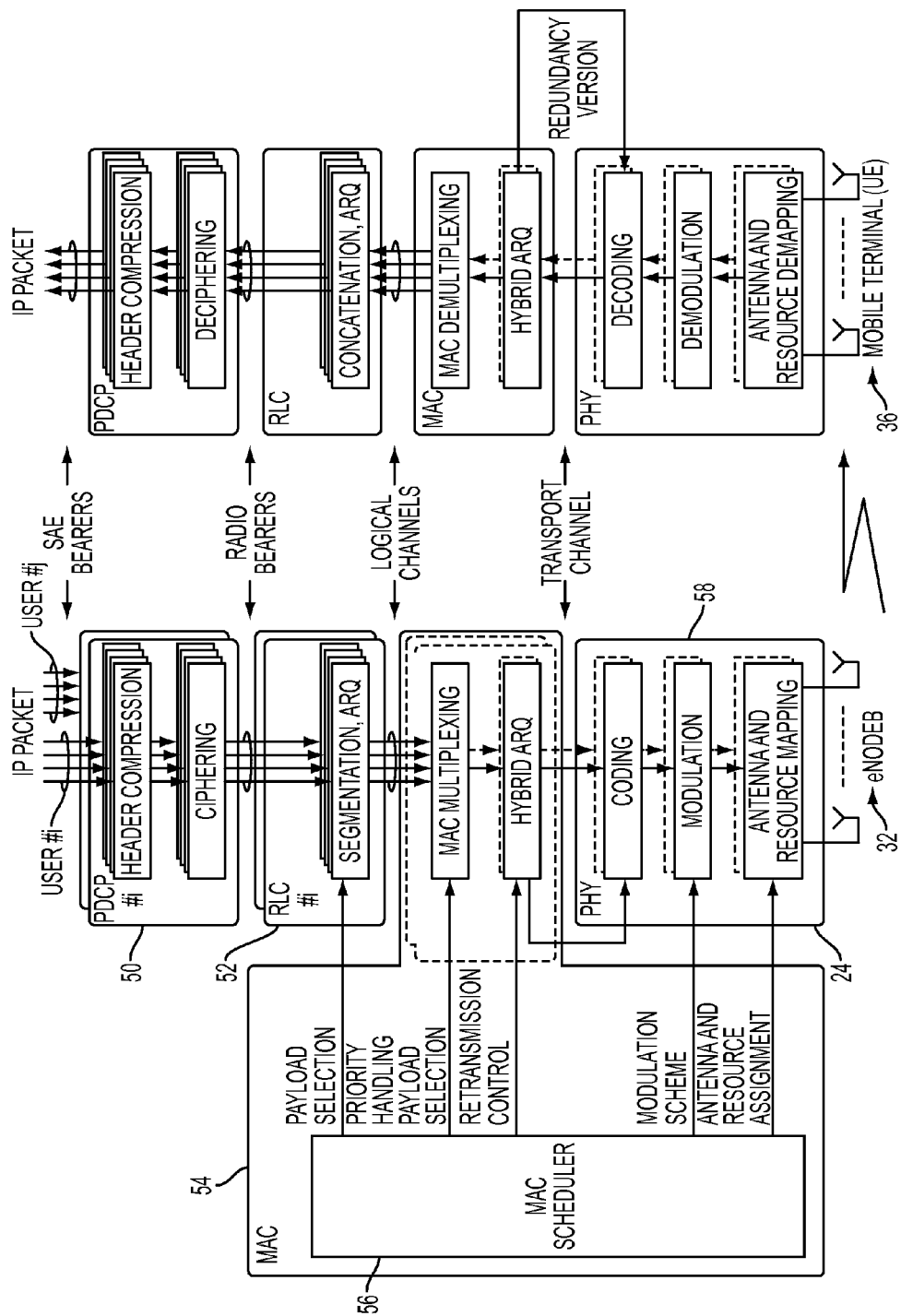
FIG. 11 shows elements of transmit/receive chains in which example embodiments can be implemented.

One example LTE architecture for processing data for transmission by an eNodeB 32 to a UE 36, i.e., in the downlink (DL) is shown in FIG. 11. Therein, data to be transmitted by the eNodeB 32, e.g., IP packets, to a particular user is first processed by a packet data convergence protocol (PDCP) entity 50 in which the IP headers can be compressed and ciphering of the data is performed. The radio link control (RLC) entity 52 handles, among other things, segmentation of—and/or concatenation of—the data received from the PDCP entity 50 into protocol data units (PDUs). Additionally, the RLC entity 52 provides a retransmission protocol (ARQ) which monitors sequence number status reports from its counterpart RLC entity in the UE 36 to selectively retransmit PDUs as requested. The medium access control (MAC) entity 54 is responsible for uplink and downlink scheduling via scheduler 56, as well as the hybrid-ARQ processes discussed above. A physical (PHY) layer entity 58 takes care of coding, modulation, and multi-antenna mapping, among other things. Each entity 50-58 shown in FIG. 11 provides outputs to, and receives inputs from, their adjacent entities by way of bearers or channels as shown. The reverse of these processes are provided for the UE 36 as shown in FIG. 11 for the received data, and it will be appreciated by those skilled in the art that, although not shown in FIG. 11, the UE 36 also has similar transmit chain elements as the eNB 32 for transmitting on the uplink (UL) toward the eNB 32 and the eNB 32 also has similar receive chain elements as the UE 36 for receiving data from the UE 36 on the UL.

Having described some example LTE devices in which aspects of soft buffer handling according to embodiments can be implemented, the discussion now returns to such soft buffer handling in the context of carrier aggregation. Various techniques can be applied to attempt to deal with the issue of limited soft buffer space in view of potentially multiple component carriers for a particular UE. One method would be to divide the total soft buffer space equally amongst the number of configured or activated component carriers. Then, each of the sub-buffers is treated as a buffer as it would have been used in the Rel-8 operations. That is, each of the sub-buffers is then divided into the number of HARQ processes and then further divided into the number of MIMO codewords. Denote the soft buffer size for a transport block on a component carrier $n_c$ by $N_{IR}(n_c)$. The size of $N_{IR}(n_c)$ is given by:

$$N_{IR}(n_c) = \left\lfloor \frac{N_{soft} / N_{cells}^{DL}}{K_{MIMO}(n_c) \cdot \min(M_{DL\_HARQ}, M_{limit})} \right\rfloor \quad (1)$$

where:

$N_{soft}$ is the total number of soft channel bits in 3GPP Technical Specification 36.306 V10.0.0, $M_{DL\_HARQ}$ is the maximum number of DL HARQ processes as defined in section 7 of 3GPP Technical Specification 36.213 V10.0.0, $M_{limit}$ is a constant equal to 8, $N_{cells}^{DL}$ is the number of configured/activated component carriers/cells for that UE, $n_c$ is a index of the component carriers (i.e., $n_c = 0, 1, \ldots, N_{cells}^{DL} - 1$), and $K_{MIMO}(n_c)$ is equal to 2 if the UE is configured to receive PDSCH transmissions on the $n_c$-th carrier, based on transmission modes 3, 4, 8 or 9 as defined in section 7.1 of 36.213, and is equal to 1 otherwise.

By using the floor function in equation (1) to determine the soft buffer size to be allocated or reserved for a transport block on a component carrier according to this embodiment, the number of soft bits assigned for each component carrier does not exceed the total maximum buffer size if all of the component carriers are considered.

Figure 12:
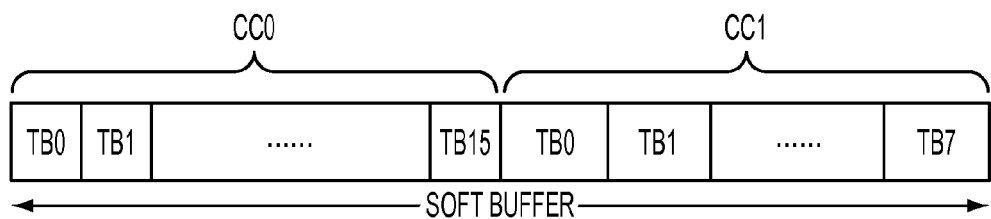
FIGS. 12 and 13 show different soft buffer allocation strategies.

To illustrate this soft buffer allocation method, a case is shown in FIG. 12 where Component Carrier 0 (CC0) is configured for dual-codeword MIMO and Component Carrier 1 (CC1) is configured for single-codeword transmissions. While this allocation method is easy to implement, it also retains the drawback from Rel-8 that the soft buffer size of the transport block on the carrier with two codewords transmission is very limited. This limitation reduces the effectiveness of soft combining gains from incremental redundancy retransmissions.

A second method aims to provide full flexibility in soft buffer allocation. With this technique, the total number of codewords from all component carriers and the associated configured MIMO modes are accounted for. The soft buffer is then equally divided amongst all codewords. More specifically, the soft buffer size for a codeword, and indeed all codewords according to this embodiment, is given by:

$$N_{IR} = \left\lfloor \frac{N_{soft}}{\sum_{j=0}^{N_{cells}^{DL}-1} K_{MIMO}(j) \cdot \min(M_{DL\_HARQ}, M_{limit})} \right\rfloor \quad (2)$$

Figure 13:

To illustrate this soft buffer allocation method, a case is illustrated in FIG. 13 where CC0 is configured for dual-codeword MIMO and CC1 is configured for single-codeword transmissions. It can be seen in FIG. 13 that this second allocation method improves upon the first described above with respect to FIG. 12 by increasing the soft buffer size reserved for codewords in dual-codeword MIMO transmission modes. However, such allocation freely changes the soft buffer boundaries between different HARQ processes, i.e., if the number of transport blocks associated with a component carrier changes in some way, then the buffer size for all HARQ processes for all component carriers associated with that UE will also change. This places a high complexity in hardware implementation and introduces many potential operation error scenarios. Note also that, because the soft buffer boundaries change, operating errors in one HARQ process can spill over to other HARQ processes, which magnifies the severity of any one HARQ operation error.

Two other potential possible soft buffer allocation methods have been discussed in the 3GPP contribution denoted R1-106513, "Soft Buffer Allocation for Rel-10 Downlink". The first alternative discussed in this 3GPP contribution is described as follows, where first the soft buffer size for each component carrier $n_c$ is determined in $N_{soft}(n_c)$.

$$N_{soft}(n_c) = \frac{N_{soft} \cdot L_{max}(n_c) \cdot BW(N_c)}{\sum_{j=0}^{N_{cells}^{DL}-1} L_{max}(j) \cdot BW(j)} \quad (3)$$

where:

$N_{soft}$, $n_c$ and $N_{cells}^{DL}$ are defined above, $L_{max}(n_c)$ is the maximum number of DL layers on the $n_c$-th carrier, $BW(n_c)$ is the bandwidth of the $n_c$-th component carrier in MHz, and $BW(j)$ is the bandwidth of the $j$-th component carrier in MHz.

The size of the soft buffer for a transport block on component carrier $n_c$ is determined by:

$N_{IR}(n_c)$. The size of $N_{IR}(n_c)$ is given by:

$$N_{IR}(n_c) = \left\lfloor \frac{N_{soft}(n_c)}{K_{MIMO}(n_c) \cdot \min(M_{DL\_HARQ}, M_{limit})} \right\rfloor \quad (4)$$

where:

$K_{MIMO}(n_c)$, $M_{DL\_HARQ}$ and $M_{limit}$ are as defined above.

Comparing this first alternative from the 3GPP contribution with the two other examples described above with respect to FIGS. 12 and 13, it can be seen that that this alternative will potentially yield a different soft buffer size per component carrier. This is based on the component carriers' capabilities.

The above-described techniques for handling soft buffers in light of carrier aggregation suffer from certain drawbacks. For example, both of the techniques described above with respect to FIGS. 12 and 13 will give a static soft buffer division based on the maximum number of supported component carriers. However, these techniques do not consider, if a fewer number of component carriers than the maximum number of supported component carriers are aggregated, the configuration of these carriers and the coverage of the carriers.

The R1-106513 proposal described above considers the number of aggregated carriers and how these aggregated component carriers can be configured. However this proposal is purely based on the soft buffer sizes being weighted based on the UE and eNB capability in terms of bandwidth and number of supported layers. The carriers can, however, have different coverage due to different output power on each component carrier and/or the carriers being deployed at different frequencies, which according to embodiments described below, motivate different weighting of the carriers and their respective number of layers, or a combination thereof. Further the coverage areas of higher throughput 8 and 4 layers is less than higher throughput regions of 2 layers or 1 layer. Further the eNB can also have different processing capability at the different carriers. Further the eNB can have information about spectrum sharing policies for different spectra. In future LTE (or even Rel-11) deployments, the different cells (or component carriers) configured for a UE may have mix of exclusive, shared, unlicensed spectra. For such mix of different spectra, it is beneficial if different BLER targeting, different HARQ protocols (maybe even no HARQ) and different HARQ soft buffer sizes should be applied to different cells (component carriers). Thus, according to embodiments, to be able to also reflect the relative coverage of different carriers, the soft buffer division formula per component carrier should contain a weighting factor that is determined by the eNB and signaled to the UE. The weighting factor can also be signaled to the UE in form of an index and the UE selects the corresponding weighting factor from a lookup table.

According to an embodiment, a weighting factor $a(n_c)$ is signaled per aggregated component carrier. An aggregated component carrier generally refers to an activated component carrier, a configured component carrier and/or a supported component carrier based on the UE's capability. A component carrier could also be referred to as a cell. For each aggregated component carrier it is possible to signal a single value for $a(n_c)$ out of a set of values according to an embodiment.

The eNB can for example determine which value of $a(n_c)$ to signal to the terminal based on any one or a combination of these factors:
- bandwidth of each aggregated component carriers,
  - the bandwidth can be measured in terms of MHz
  - the bandwidth can be measured in terms of number of resource blocks (RB) as given by the RRC parameter dl-Bandwidth in 3GPP TS 36.331 V10.0.0
- number of supported layers of each aggregated component carrier,
- coverage of each aggregated component carrier or
- throughput limitations in the eNB processing.

Below are described some non-limiting embodiments given to show how the weighting factor $a(n_c)$ could be determined and used in soft buffer division.

In a first embodiment each aggregated component carrier is assigned a weighting factor $a(n_c)$. The total soft buffer for each component carrier is then given by the weighting factor for the specific component carrier and the sum of all the weights for all the component carriers. In this first embodiment, each aggregated component carrier is assigned a weighting factor $a(n_c)$. First the soft buffer size for each component carrier $n_c$ is determined in $N_{soft}(n_c)$ as:

$$N_{soft}(n_c) = \frac{N_{soft} \cdot a(n_c)}{\sum_{j=0}^{N_{cells}^{DL}-1} a(j)} \quad (5)$$

where:
$N_{soft}$, and $N_{cells}^{DL}$ are defined above.

The size of the soft buffer for a transport block on component carrier $n_c$ is determined by: $N_{IR}(n_c)$. The size of $N_{IR}(n_c)$ is given by:

$$N_{IR}(n_c) = \left\lfloor \frac{N_{soft}(n_c)}{K_{MIMO}(n_c) \cdot \min(M_{DL\_HARQ}, M_{limit})} \right\rfloor \quad (6)$$

where $K_{MIMO}(n_c)$, $M_{DL\_HARQ}$ and $M_{limit}$ are defined above.

Thus, the formula (5) above for $N_{soft}(n_c)$ determines the number of soft buffer bits for a component carrier nc and the formula (6) above for $N_{IR}(n_c)$ determines the number of soft buffer bits for a transport block on component carrier nc. Thus this embodiment can also be characterized, for example, as calculating the buffer portion for each component carrier by multiplying a total number of bits which can be stored in the buffer with the weighting factor associated with the respective component carrier, a result of which is divided by a sum of all weighting factors associated with the component carriers allocated to the terminal device According to another embodiment, the weighting factor $a(n_c)$ could also be defined so that the sum of all the weighting factors are not considered as in the two further examples below. More specifically, according to this example embodiment the formula $N_{IR}(n_c)$ which is used to determine the number of soft buffer bits for a transport block on component carrier nc is written in another way so that there is not a summation over all the weighting factors for all other component carrier to determine a specific component carrier's weighting. The consequence of this is that eNB has to make sure that the sum of all the weighting factor for different component carriers are not more than 1, as otherwise the total soft buffer size will be exceeded.

For example:

$$N_{IR}(n_c) = \left\lfloor \frac{N_{soft} \cdot a(n_c)}{N_{cells}^{DL} \cdot K_{MIMO}(n_c) \cdot \min(M_{DL\_HARQ}, M_{limit})} \right\rfloor \quad (7)$$

where:
$a(n_c)$ is a weighting factor associated with a component carrier.
$N_{soft}$, $M_{DL\_HARQ}$ and $M_{limit}$ and $N_{cells}^{DL}$ are defined above.
$K_{MIMO}(n_c)$ is equal to 2 if the UE is configured to receive PDSCH transmissions on the $n_c$-th carrier, based on transmission modes 3, 4, 8 or 9 as defined in section 7.1 of 3GPP TS 36.213 V10.0.0 "Physical Layer Procedures", 1 otherwise.

Thus equation (7) can, for example, be characterized as performing allocation of the buffer by determining a number of buffer bits allocated in the buffer for a transport block received on one of the component carriers by multiplying a total number of bits which can be stored in the buffer with the weighting factor associated with the one of the component carriers, a result of which is divided by a multiplication result of (a) a number of component carriers allocated to the terminal device, (b) a constant whose value depends on a transmission mode associated with the one of the component carriers and (c) a lesser of a number of downlink hybrid automatic repeat request (HARQ) processes and a constant value.

Another example is given below.

$$N_{IR}(n_c) = \left\lfloor \frac{N_{soft}}{N_{cells}^{DL} \cdot a(n_c) \cdot K_{MIMO}(n_c) \cdot \min(M_{DL\_HARQ}, M_{limit})} \right\rfloor \quad (8)$$

where:
$a(n_c)$ is a weighting factor associated with a component carrier.
$N_{soft}$, $M_{DL\_HARQ}$ and $M_{limit}$ and $N_{cells}^{DL}$ are defined above.
$K_{MIMO}(n_c)$ is equal to 2 if the UE is configured to receive PDSCH transmissions on the $n_c$-th carrier, based on transmission modes 3, 4, 8 or 9 as defined in section 7.1 of 3GPP TS 36.213 V10.0.0 "Physical Layer Procedures", 1 otherwise.

Thus, equation (8) can, for example, be characterized as performing allocation of the buffer by determining a number of buffer bits allocated in the buffer for a transport block received on one of the component carriers by dividing a total number of bits which can be stored in the buffer with a multiplication result of (a) a number of component carriers allocated to the terminal device, (b) the weighting factor associated with the one of the component carriers, (c) a constant whose value depends on a transmission mode associated with the one of the component carriers and (d) a lesser of a number of downlink hybrid automatic repeat request (HARQ) processes and a constant value.

In a modified version of the first example of the first embodiment, i.e., the embodiment including equation (6) also the configured transmission modes are considered in such a way that each codeword has the same soft buffer size, independent of which transmission mode is configured for a component carrier. The soft buffer size for each codeword can be expressed as:

$$N_{IR}(n_c) = \left\lfloor \frac{N_{soft} \cdot a(n_c) \cdot K_{MIMO}(n_c)}{\sum_{j=0}^{N_{cells}^{DL}-1} a(j) \cdot K_{MIMO}(j) \cdot \min(M_{DL\_HARQ}, M_{limit})} \right\rfloor \quad (9)$$

where:
$a(n_c)$ is a weighting factor associated with a component carrier.

$N_{soft}$, $M_{DL\_HARQ}$ and $M_{limit}$ and $N_{cells}^{DL}$ are defined above.

$K_{MIMO}(n_c)$ is equal to 2 if the UE is configured to receive PDSCH transmissions on the $n_c$-th carrier, based on transmission modes 3, 4, 8 or 9 as defined in section 7.1 of 3GPP TS 36.213 V10.0.0 "Physical Layer Procedures", 1 otherwise, and those other terms are as described above.

Thus, allocation of the buffer using equation (9) can, for example, be characterized as determining a number of buffer bits allocated in the buffer for a transport block received on one of the component carriers by multiplying a total number of bits which can be stored in the buffer with the weighting factor associated with the one of the component carriers and with a constant whose value depends on a transmission mode associated with the one of the component carriers, the result being divided by a sum of a plurality of multiplication results, each multiplication result associated with a different one of the component carriers allocated to the terminal device and including the weighting factor associated with the respective component carrier times a constant whose value depends on a transmission mode associated with the respective component carrier and times a lesser of a number of downlink hybrid automatic repeat request (HARD) processes and a constant value.

Without normalization by a(j) in the sum term above expression becomes $$N_{IR}(n_c) = \left\lfloor \frac{N_{soft} \cdot a(n_c) \cdot K_{MIMO}(n_c)}{\sum_{j=0}^{N_{cells}^{DL}-1} K_{MIMO}(j) \cdot \min(M_{DL\_HARQ}, M_{limit})} \right\rfloor \quad (10)$$

or equivalently ($a(n_c) \rightarrow 1/a(n_c)$)

$$N_{IR}(n_c) = \left\lfloor \frac{N_{soft} \cdot K_{MIMO}(n_c)}{a(n_c) \cdot \sum_{j=0}^{N_{cells}^{DL}-1} K_{MIMO}(j) \cdot \min(M_{DL\_HARQ}, M_{limit})} \right\rfloor \quad (11)$$

where:
$a(n_c)$ is a weighting factor associated with a component carrier.

$N_{soft}$, $M_{DL\_HARQ}$ and $M_{limit}$ and $N_{cells}^{DL}$ are defined above.

$K_{MIMO}(n_c)$ is equal to 2 if the UE is configured to receive PDSCH transmissions on the $n_c$-th carrier, based on transmission modes 3, 4, 8 or 9 as defined in section 7.1 of 3GPP TS 36.213 V10.0.0 "Physical Layer Procedures", 1 otherwise, and those other terms are as described above.

It is further also possible to combine alternative 1 in the R1-106513 proposal described above with example embodiments so that an eNB determines the weighting factor $a(n_c)$ together with the weighting of each component carriers bandwidth and number of support layers as described below. First the soft buffer size for each component carrier $n_c$ is determined in $N_{soft}(n_c)$ as:

$$N_{soft}(n_c) = \frac{N_{soft} \cdot L_{max}(n_c) \cdot BW(n_c) \cdot a(n_c)}{\sum_{j=0}^{N_{cells}^{DL}-1} L_{max}(j) \cdot BW(j) \cdot a(j)} \quad (12)$$

where:
$a(n_c)$ and $a(j)$ are weighting factors;

$L_{max}(n_c)$ is the maximum number of DL layers on the $n_c$-th carrier.

$BW(j)$ is the bandwidth of the j-th component carrier in MHz.

$N_{soft}$, and $N_{cells}^{DL}$ are described above.

The size of the soft buffer for a transport block on component carrier $n_c$ is determined by $N_{IR}(n_c)$. The size of $N_{IR}(n_c)$ is given by:

$$N_{IR}(n_c) = \left\lfloor \frac{N_{soft}(n_c)}{K_{MIMO}(n_c) \cdot \min(M_{DL\_HARQ}, M_{limit})} \right\rfloor \quad (13)$$

where:
$K_{MIMO}(n_c)$ is equal to 2 if the UE is configured to receive PDSCH transmissions on the $n_c$-th carrier, based on transmission modes 3, 4, 8 or 9 as defined in section 7.1 of 3GPP TS 36.213 V10.0.0 "Physical Layer Procedures", 1 otherwise.

$M_{DL\_HARQ}$ and $M_{limit}$ are described above.

The weighting factor $a(n_c)$ could also be defined so that the sum of all the weighting factors are not considered, i.e., by omitting the sum taken over all weighting factors for all component carriers when determining the soft buffer size for a particular component carrier, as in the two further examples below. Among other things, this simplifies the calculation of the weighting factor.

Further Example 1:

$$N_{soft}(n_c) = \frac{N_{soft} \cdot L_{max}(n_c) \cdot BW(n_c) \cdot a(n_c)}{\sum_{j=0}^{N_{cells}^{DL}-1} L_{max}(j) \cdot BW(j)} \quad (14)$$

$$N_{IR}(n_c) = \left\lfloor \frac{N_{soft}(n_c)}{K_{MIMO}(n_c) \cdot \min(M_{DL\_HARQ}, M_{limit})} \right\rfloor \quad (15)$$

Further Example 2:

$$N_{soft}(n_c) = \frac{N_{soft} \cdot L_{max}(n_c) \cdot BW(n_c)}{a(n_c) \cdot \sum_{j=0}^{N_{cells}^{DL}-1} L_{max}(j) \cdot BW(j)} \quad (16)$$

$$N_{IR}(n_c) = \left\lfloor \frac{N_{soft}(n_c)}{K_{MIMO}(n_c) \cdot \min(M_{DL\_HARQ}, M_{limit})} \right\rfloor \quad (17)$$

Embodiments of the present invention also cover the aspect that the weighting factor $a(n_c)$ is applied within the function $N_{IR}(n_c)$.

According to another embodiment, the total soft buffer shall first be equally divided amongst the number of HARQ processes. Each of the sub-buffers is then further sub-divided into the total number of codewords across all configured or activated component carriers. As a result, the soft buffer sizes for all transport blocks are identical. The subdivision step can be refined to reflect the relative bandwidth, throughput and coverage through the weighting factor $a(n_c)$ signaled by the network. Specifically, the soft buffer size for the transport block on a component carrier $n_c$ is denoted as $N_{IR}(n_c)$.

$$N_{IR}(n_c) = \left\lfloor \frac{a(n_c) \cdot N_{soft} / \min(M_{DL\_HARQ}, M_{limit})}{\sum_{j=0}^{N_{cells}^{DL}-1} a(j) \cdot K_{MIMO}(j)} \right\rfloor \quad (18)$$

The total soft buffer is first equally divided amongst the number of HARQ processes. Each of the sub-buffers is further sub-divided according to the weighting factor $a(n_c)$ and the configured MIMO transmission mode for each configured component carrier.

According to another example embodiment, the weighting factor $a(n_c)$ could also be defined so that the sum of all the weighting factors are not considered as in the two further examples below.

Further Example 1:

$$N_{IR}(n_c) = \left\lfloor \frac{a(n_c) \cdot N_{soft} / \min(M_{DL\_HARQ}, M_{limit})}{\sum_{j=0}^{N_{cells}^{DL}-1} K_{MIMO}(j)} \right\rfloor \quad (19)$$

Further Example 2:

$$N_{IR}(n_c) = \left\lfloor \frac{N_{soft} / \min(M_{DL\_HARQ}, M_{limit})}{a(n_c) \sum_{j=0}^{N_{cells}^{DL}-1} K_{MIMO}(j)} \right\rfloor \quad (20)$$

From the foregoing, it will be appreciated that according to embodiments, the available soft buffer memory per component carrier can reflect the coverage area and/or the available processing power in the eNB per component carrier. This enables a more accurate soft buffer division to be able to get higher incremental redundancy gains, which will give higher throughput.

Figure 14:
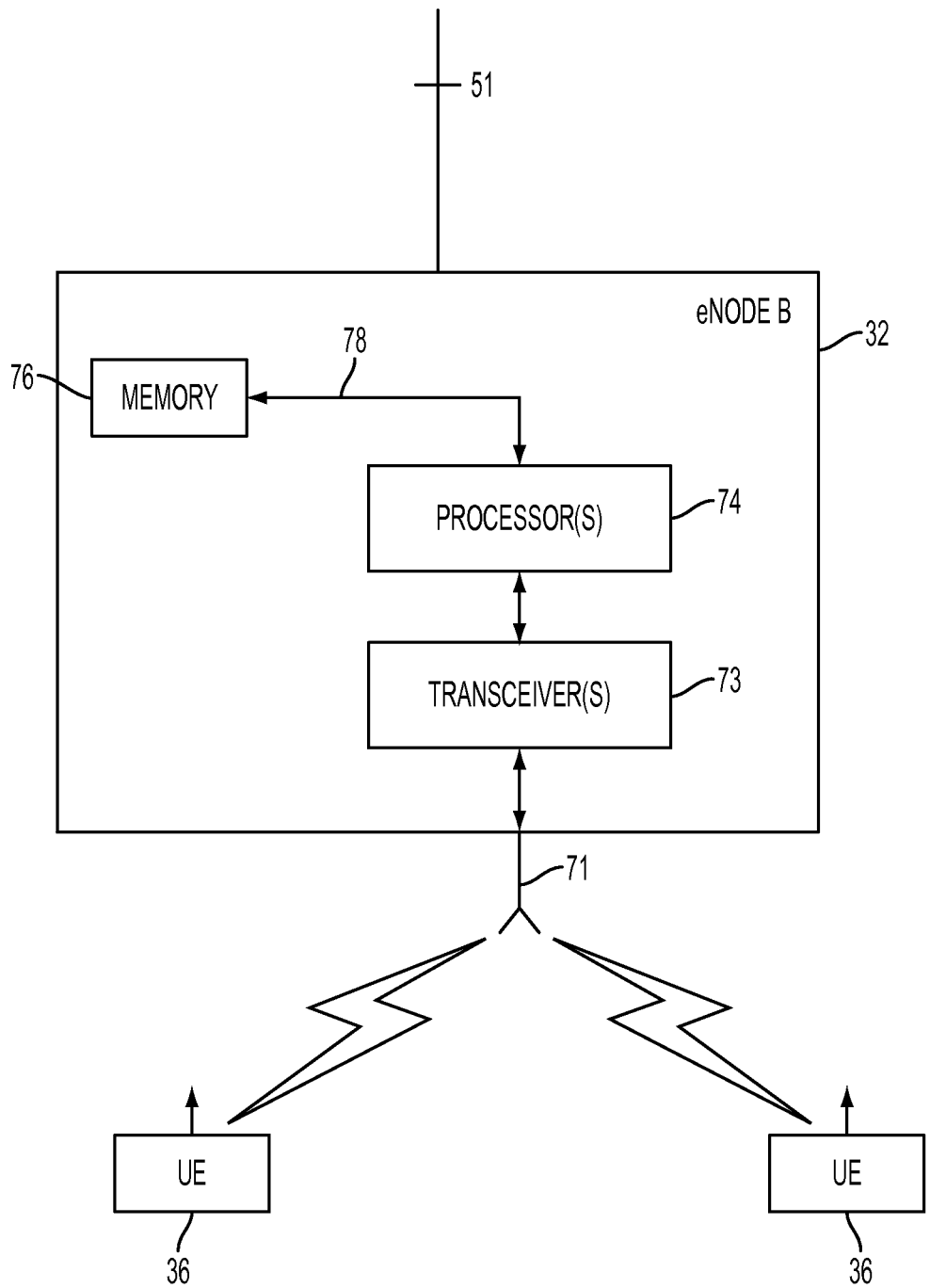
FIG. 14 depicts various hardware elements of an eNodeB or terminal in which example embodiments can be implemented.

An example base station 32, e.g., an eNodeB, which transmits weighting factors as above is generically illustrated in FIG. 14. Therein, the eNodeB 32 includes one or more antennas 71 connected to processor(s) 74 via transceiver(s) 73. The processor 74 is configured to analyze and process signals received over an air interface via the antennas 71, as well as those signals received from core network nodes, e.g., access gateway, via, e.g., an S1 interface. The processor(s) 74 may also be connected to one or more memory device(s) 76 via a bus 78. Further units or functions, not shown, for performing various operations as encoding, decoding, modulation, demodulation, encryption, scrambling, precoding, etc. may optionally be implemented not only as electrical components but also in software or a combination of these two possibilities as would be appreciated by those skilled in the art to enable the transceiver(s) 73 and processor(s) 74 to process uplink and downlink signals. A similar, generic structure, e.g., including a memory device, processor(s) and a transceiver, can be used (among other things) to implement communication nodes such as UEs 36 to receive soft buffer weighting factors on a per component carrier basis and to use them in the manner described above to allocate soft buffer resources for storing codewords and/or transport blocks.

Figure 15:
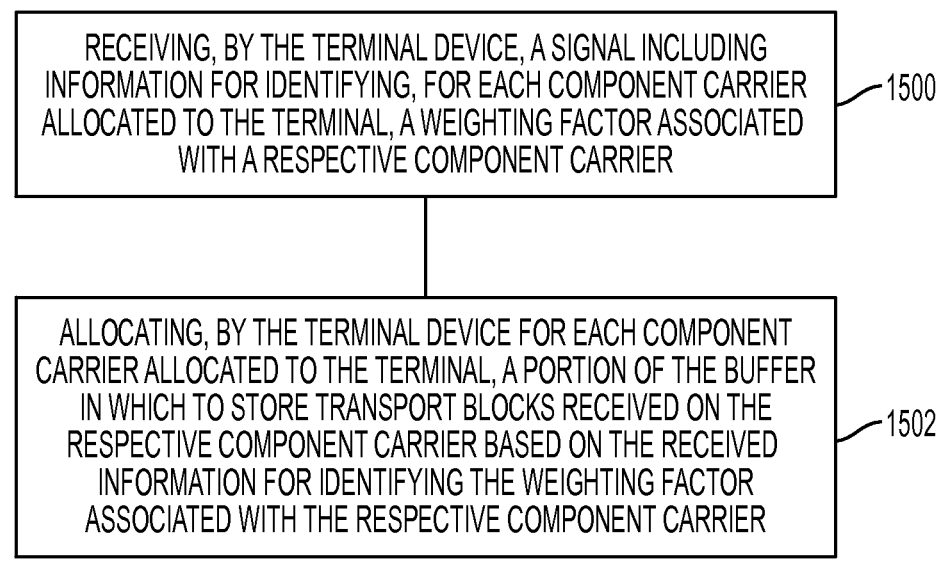

According to an embodiment, a method for allocating portions of a buffer in a terminal device includes the steps shown in the flowchart of FIG. 15. Therein, at step 1500, a signal is received, by the terminal device, including information for identifying, for each component carrier allocated to the terminal, a weighting factor associated with a respective component carrier. Then, at step 1502, the terminal device allocates, for each component carrier allocated to the terminal, a portion of the buffer in which to store transport blocks received on the respective component carrier based on the received information for identifying the weighting factor associated with the respective component carrier. The information for identifying the weighting factor may, for example, include an index associated with one or more weighting factors or it may comprise the weighting factor itself.

According to another embodiment, a method for handling a buffer in a terminal includes the steps shown in FIG. 16. Therein, at step 1600, information for identifying, for each component carrier allocated to the terminal, a weighting factor associated with a respective component carrier allocated to the terminal is transmitted by a base station.

According to one example embodiment, a method for handling a soft buffer includes the steps of: transmitting a weighting factor associated with each component carrier allocated to a terminal, wherein the weighting factor is determined, at least in part, based upon at least one of: bandwidth of a respective component carrier, a number of supported layers of said respective component carrier, a relative coverage of said respective component carrier and a throughput limitation of a transmitting base station. The weighting factor is one of the factors that can be used to determine how much of the soft buffer's size is allocated or reserved for a particular transport block on an associated component carrier. An associated component carrier can, for example, be one or more activated component carrier(s), one or more configured component carrier(s), and/or one or more supported component carrier(s)

which have been allocated to the terminal. The weighting factor can be determined in a number of different ways.

According to another example embodiment, a base station can include a transceiver configured to transmit a weighting factor associated with each component carrier allocated to a terminal, wherein the weighting factor is determined, at least in part, based upon at least one of: bandwidth of a respective component carrier, a number of supported layers of said respective component carrier, a relative coverage of said respective component carrier and a throughput limitation of a transmitting base station. The weighting factor is one of the factors that can be used to determine how much of the soft buffer's size is allocated or reserved for a particular transport block on an associated component carrier. An associated component carrier can, for example, be one or more activated component carrier(s), one or more configured component carrier(s), and/or one or more supported component carrier(s) which have been allocated to the terminal. The weighting factor can be determined in a number of different ways.

According to yet another example embodiment, a method for allocating portions of a buffer in a terminal can include the steps of: receiving a signal including a weighting factor associated with each component carrier allocated to the terminal, wherein the weighting factor is determined, at least in part, based upon at least one of: bandwidth of a respective component carrier, a number of supported layers of said respective component carrier, a relative coverage of said respective component carrier and a throughput limitation of a transmitting base station. The weighting factor is used by the terminal to allocate a portion of the buffer for each component carrier to store received codewords. Each component carrier can, for example, be one or more activated component carrier(s), one or more configured component carrier(s), and/or one or more supported component carrier(s) which have been allocated to the terminal. The weighting factor can be determined in a number of different ways.

According to yet another example embodiment, a terminal device can include: a transceiver configured to receive a signal including a weighting factor associated with each component carrier allocated to the terminal, wherein the weighting factor is determined, at least in part, based upon at least one of: bandwidth of a respective component carrier, a number of supported layers of said respective component carrier, a relative coverage of said respective component carrier and a throughput limitation of a transmitting base station. The weighting factor is used by the terminal to allocate a portion of the buffer for each component carrier to store received codewords. Each component carrier can, for example, include one or more activated component carrier(s), one or more configured component carrier(s), and/or one or more supported component carrier(s) which have been allocated to the terminal. The weighting factor can be determined in a number of different ways.

The above-described embodiments are intended to be illustrative in all respects, rather than restrictive, of the present invention. All such variations and modifications are considered to be within the scope of the present invention as defined by the following claims. No element, act, or instruction used in the description of the present application should be construed as critical or essential to the invention unless explicitly described as such. Also, as used herein, the article "a" is intended to include one or more items.

The invention claimed is:

1. A method in a terminal device for allocating portions of a buffer, the terminal device receiving transport blocks transmitted by a base station on one or more component carriers allocated to the terminal device, the method comprising:

receiving, by the terminal device, a signal including information for identifying, for each component carrier allocated to the terminal device, a weighting factor associated with a respective component carrier; and allocating, by the terminal device for each component carrier allocated to the terminal device, a portion of the buffer in which to store transport blocks received on the respective component carrier based on the received information for identifying the weighting factor associated with the respective component carrier, wherein the step of allocating further comprises:

calculating the buffer portion for each component carrier by multiplying a total number of bits which can be stored in the buffer with the weighting factor associated with the respective component carrier, a result of which is divided by a sum of all weighting factors associated with the component carriers allocated to the terminal device.

2. The method of claim 1, wherein each of the one or more component carriers is one of: an activated component carrier, a configured component carrier, and a supported component carrier.

3. The method of claim 1, wherein the information received by the terminal device for identifying, for each component carrier allocated to the terminal device, the weighting factor associated with the respective component carrier is at least one index, the method further comprising:

looking up, by the terminal device using the at least one index, the weighting factor for each component carrier.

4. The method of claim 1, wherein the step of allocating further comprises:

calculating, using the weighting factor associated with the respective component carrier, a buffer size allocated for each component carrier.

5. The method of claim 1, wherein the step of allocating further comprises:

calculating, using the weighting factor associated with the respective component carrier, a buffer size allocated for each transport block on each component carrier.

6. The method of claim 1, wherein the step of allocating further comprises:

determining a number of buffer bits allocated in the buffer for a transport block received on one of the component carriers by multiplying the total number of bits which can be stored in the buffer with the weighting factor associated with the one of the component carriers, a result of which is divided by a multiplication result of (a) a number of component carriers allocated to the terminal device, (b) a constant whose value depends on a transmission mode associated with the one of the component carriers and (c) a lesser of a number of downlink hybrid automatic repeat request (HARQ) processes and a constant value.

7. The method of claim 1, wherein the step of allocating further comprises:

determining a number of buffer bits allocated in the buffer for a transport block received on one of the component carriers by dividing the total number of bits which can be stored in the buffer with a multiplication result of (a) a number of component carriers allocated to the terminal device, (b) the weighting factor associated with the one of the component carriers, (c) a constant whose value depends on a transmission mode associated with the one of the component carriers and (d) a lesser of a number of downlink hybrid automatic repeat request (HARQ) processes and a constant value.

8. The method of claim 1, wherein the step of allocating further comprises:
   determining a number of buffer bits allocated in the buffer for a transport block received on one of the component carriers by multiplying the total number of bits which can be stored in the buffer with the weighting factor associated with the one of the component carriers and with a constant whose value depends on a transmission mode associated with the one of the component carriers, the result being divided by a sum of a plurality of multiplication results, each multiplication result associated with a different one of the component carriers allocated to the terminal device and including the weighting factor associated with the respective component carrier times a constant whose value depends on a transmission mode associated with the respective component carrier and times a lesser of a number of downlink hybrid automatic repeat request (HARQ) processes and a constant value.

9. The method of claim 1, wherein the weighting factor is determined, at least in part, based upon at least one of: bandwidth of the respective component carrier, a number of supported layers of said respective component carrier, a relative coverage of said respective component carrier and a throughput limitation of the base station.

10. The method, terminal device or base station of claim 1, wherein the one or more component carriers is more than one component carrier.

11. A terminal device comprising:
   a transceiver configured to receive transport blocks transmitted by a base station on one or more component carriers allocated to the terminal device, the transceiver further configured to receive a signal including information for identifying, for each component carrier allocated to the terminal device, a weighting factor associated with a respective component carrier,
   a buffer memory device configured to store received transport blocks from each component carrier, and
   a processor configured to allocate, for each component carrier allocated to the terminal device, a portion of the buffer memory device in which to store the received transport blocks based on the received information for identifying the weighting factor associated with the respective component carrier,
   wherein the processor is further configured to perform the allocating by calculating the buffer portion for each component carrier by multiplying a total number of bits which can be stored in the buffer memory device with the weighting factor associated with the respective component carrier, a result of which is divided by a sum of all weighting factors associated with the component carriers allocated to the terminal device.

12. The terminal device of claim 11, wherein each component carrier is one of: an activated component carrier, a configured component carrier, and a supported component carrier.

13. The terminal device of claim 11, wherein the information received by the terminal device for identifying, for each component carrier allocated to the terminal device, the weighting factor associated with the respective component carrier is at least one index, wherein the processor is further configured to look up, using the at least one index, the weighting factor for each component carrier.

14. The terminal device of claim 11, wherein the processor is further configured to perform the allocating by calculating, using the weighting factor associated with the respective component carrier, a buffer size allocated for each component carrier.

15. The terminal device of claim 11, wherein the processor is further configured to perform the allocating by calculating, using the weighting factor associated with the respective component carrier, a buffer size allocated for each transport block on each component carrier.

16. The terminal device of claim 11, wherein the processor is further configured to perform the allocating by determining a number of buffer bits allocated in the buffer memory device for a transport block received on one of the component carriers by multiplying the total number of bits which can be stored in the buffer memory device with the weighting factor associated with the one of the component carriers, a result of which is divided by a multiplication result of (a) a number of component carriers allocated to the terminal device, (b) a constant whose value depends on a transmission mode associated with the one of the component carriers and (c) a lesser of a number of downlink hybrid automatic repeat request (HARQ) processes and a constant value.

17. The terminal device of claim 11, wherein the processor is further configured to perform the allocating by determining a number of soft buffer bits allocated in the buffer memory device for a transport block received on one of the component carriers by dividing the total number of bits which can be stored in the buffer memory device with a multiplication result of (a) a number of component carriers allocated to the terminal device, (b) the weighting factor associated with the one of the component carriers, (c) a constant whose value depends on a transmission mode associated with the one of the component carriers and (d) a lesser of a number of downlink hybrid automatic repeat request (HARQ) processes and a constant value.

18. The terminal device of claim 11, wherein the processor is further configured to perform the allocating by determining a number of buffer bits allocated in the buffer memory device for a transport block received on one of the component carriers by multiplying the total number of bits which can be stored in the buffer memory device with the weighting factor associated with the one of the component carriers and with a constant whose value depends on a transmission mode associated with the one of the component carriers, the result being divided by a sum of a plurality of multiplication results, each multiplication result associated with a different one of the component carriers allocated to the terminal device and including the weighting factor associated with the respective component carrier times a constant whose value depends on a transmission mode associated with the respective component carrier and times a lesser of a number of downlink hybrid automatic repeat request (HARQ) processes and a constant value.

19. The terminal device of claim 11, wherein the weighting factor is determined, at least in part, based upon at least one of: bandwidth of the respective component carrier, a number of supported layers of said respective component carrier, a relative coverage of said respective component carrier and a throughput limitation of the base station.

20. A method in a base station for enabling a terminal to handle a buffer for storing transport blocks transmitted by the base station to the terminal on one or more component carriers allocated to the terminal device, the method comprising:
   transmitting, by the base station, information for identifying, for each component carrier allocated to the terminal, a weighting factor associated with a respective component carrier allocated to the terminal,
   further wherein a buffer portion for each component carrier allocated to the terminal is calculated by multiplying a total number of bits which can be stored in the buffer with the weighting factor associated with the respective component carrier, a result of which is divided by a sum of all weighting factors associated with each component carrier allocated to the terminal.

21. The method of claim 20, wherein the information for identifying the weighting factor associated with the respective component carrier is usable, by the terminal, to determine how much of the buffer's size is allocated for a particular transport block on the respective component carrier.

22. The method of claim 20, wherein each of the one or more component carriers is one of: an activated component carrier, a configured component carrier, and a supported component carrier.

23. The method of claim 20, wherein the information for identifying, for each component carrier allocated to the terminal, the weighting factor associated with the respective component carrier is at least one index which can be used by the terminal to look up one or more weighting factors.

24. The method of claim 20, wherein the weighting factor is determined, at least in part, based upon at least one of: bandwidth of the respective component carrier, a number of supported layers of said respective component carrier, a relative coverage of said respective component carrier and a throughput limitation of the base station.

25. The method of claim 24, wherein the at least one of: bandwidth of the respective component carrier, a number of supported layers of said respective component carrier, a relative coverage of said respective component carrier and a throughput limitation of the base station, includes the bandwidth of the respective component carrier.

26. The method of claim 24, wherein the at least one of: bandwidth of the respective component carrier, a number of supported layers of said respective component carrier, a relative coverage of said respective component carrier and a throughput limitation of the base station, includes the number of supported layers of said respective component carrier.

27. The method of claim 24, wherein the at least one of:
bandwidth of the respective component carrier, a number of supported layers of said respective component carrier, a relative coverage of said respective component carrier and a throughput limitation of the base station, includes the relative coverage of said respective component carrier.

28. The method of claim 24, wherein the at least one of: bandwidth of the respective component carrier, a number of supported layers of said respective component carrier, a relative coverage of said respective component carrier and a throughput limitation of the base station, includes the throughput limitation of the base station.

29. A base station comprising:
a transceiver configured to transmit transport blocks to a terminal on one or more component carriers allocated to the terminal, the transceiver further configured to transmit information for identifying, for each component carrier allocated to the terminal, a weighting factor associated with a respective component carrier allocated to the terminal, further wherein a buffer portion for each component carrier allocated to the terminal is calculated by multiplying a total number of bits which can be stored in a buffer with the weighting factor associated with the respective component carrier, a result of which is divided by a sum of all weighting factors associated with each component carrier allocated to the terminal.

30. The base station of claim 29, wherein the information for identifying the weighting factor associated with the respective component carrier is usable, by the terminal, to determine how much of a soft buffer's size is allocated for a particular transport block on the respective component carrier.

31. The base station of claim 29, wherein each of the one or more component carriers is one of: an activated component carrier, a configured component carrier, and a supported component carrier.

32. The base station of claim 29, wherein the information for identifying, for each component carrier allocated to the terminal, the weighting factor associated with the respective component carrier is at least one index which can be used by the terminal to look up one or more weighting factors.

33. The base station of claim 29, wherein the weighting factor is determined, at least in part, based upon at least one of: bandwidth of the respective component carrier, a number of supported layers of said respective component carrier, a relative coverage of said respective component carrier and a throughput limitation of the base station.

34. The base station of claim 33, wherein the at least one of: bandwidth of the respective component carrier, a number of supported layers of said respective component carrier, a relative coverage of said respective component carrier and a throughput limitation of the base station, includes the bandwidth of the respective component carrier.

35. The base station of claim 33, wherein the at least one of: bandwidth of the respective component carrier, a number of supported layers of said respective component carrier, a relative coverage of said respective component carrier and a throughput limitation of the base station, includes the number of supported layers of said respective component carrier.

36. The base station of claim 33, wherein the at least one of: bandwidth of the respective component carrier, a number of supported layers of said respective component carrier, a relative coverage of said respective component carrier and a throughput limitation of the base station, includes the relative coverage of said respective component carrier.

37. The base station of claim 33, wherein the at least one of: bandwidth of the respective component carrier, a number of supported layers of said respective component carrier, a relative coverage of said respective component carrier and a throughput limitation of the base station, includes the throughput limitation of the base station.

* * * * *

UNITED STATES PATENT AND TRADEMARK OFFICE
CERTIFICATE OF CORRECTION

PATENT NO. : 8,867,463 B2  
APPLICATION NO. : 13/334451  
DATED : October 21, 2014  
INVENTOR(S) : Baldemair et al.

It is certified that error appears in the above-identified patent and that said Letters Patent is hereby corrected as shown below:

On the Title Page, Item (75), under "Inventors", in Column 1, Line 3, delete "Stockhom" and insert -- Stockholm --, therefor.

In the Specification

In Column 2, Line 24, delete "(HARM)" and insert -- (HARQ) --, therefor.

In Column 2, Line 33, delete "combinin." and insert -- combining. --, therefor.

In Column 3, Line 65, delete "Muliple-Output" and insert -- Multiple-Output --, therefor.

In Column 11, Line 55, delete "(HARD)" and insert -- (HARQ) --, therefor.

Signed and Sealed this  
Twenty-fifth Day of August, 2015

Michelle K. Lee  
*Director of the United States Patent and Trademark Office*